Sept. 22, 1970  G. W. HODDY  3,529,874
BEARING STRUCTURE
Filed Sept. 27, 1968  3 Sheets-Sheet 1
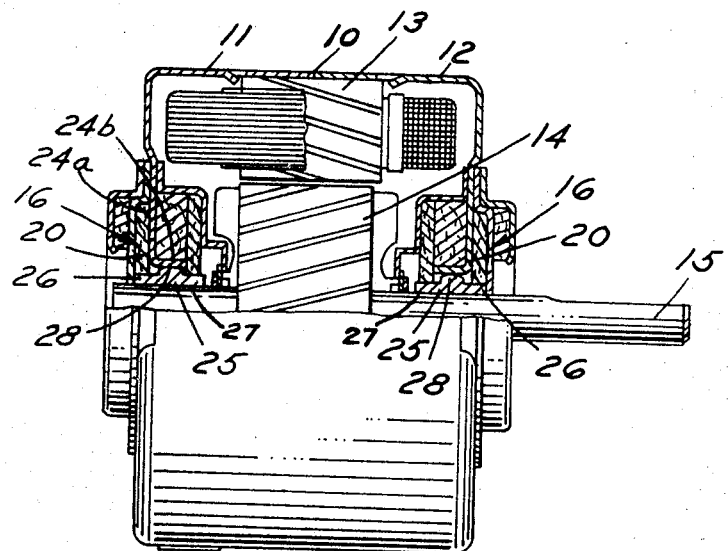
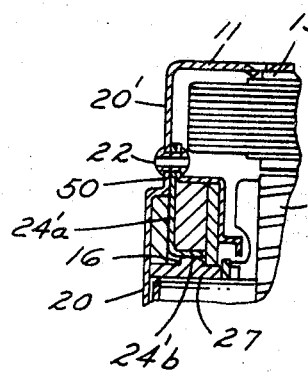
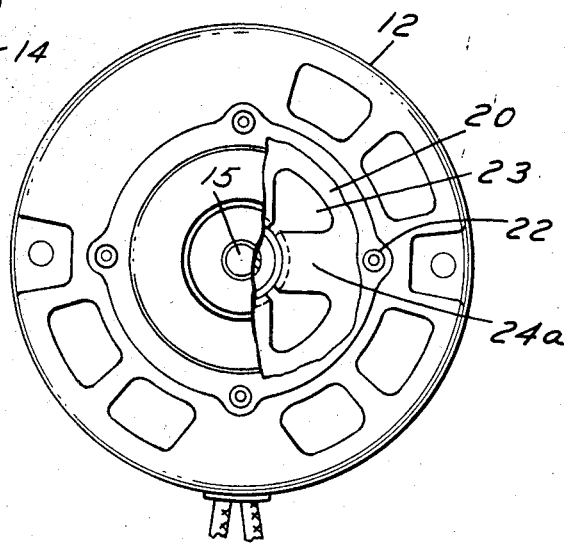
INVENTOR
GEORGE W. HODDY
BY
Barnes, Kisselle, Raisch & Choate
ATTORNEYS Sept. 22, 1970
G. W. HODDY
3,529,874
BEARING STRUCTURE
Filed Sept. 27, 1968
3 Sheets-Sheet 2
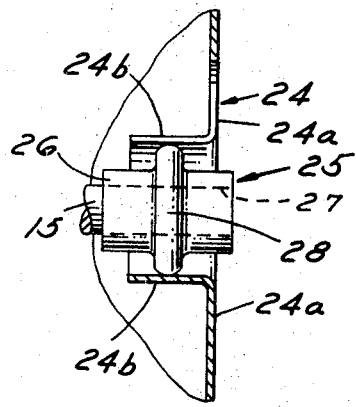
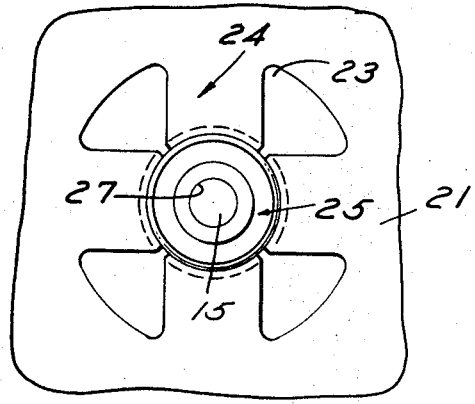
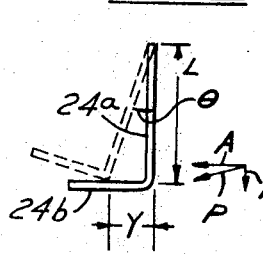
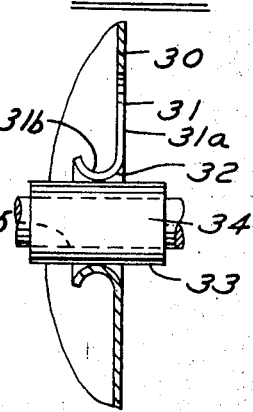
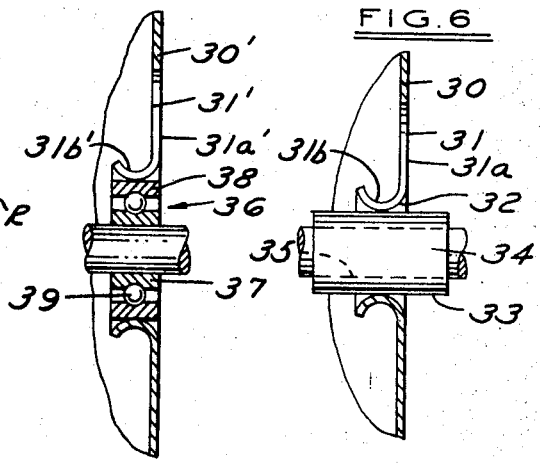
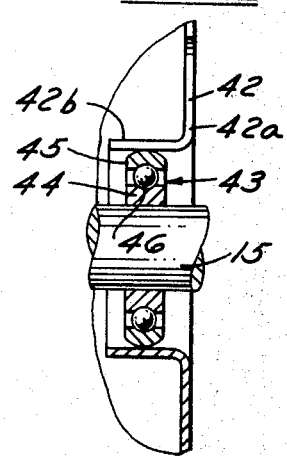
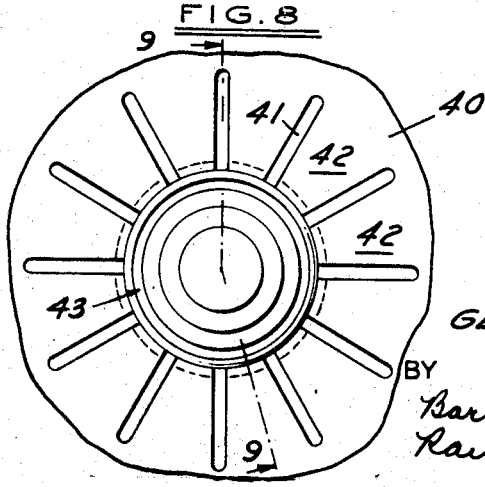
INVENTOR
GEORGE W. HODDY
BY
Barnes, Kisselle,
Raisch & Choate
ATTORNEYS

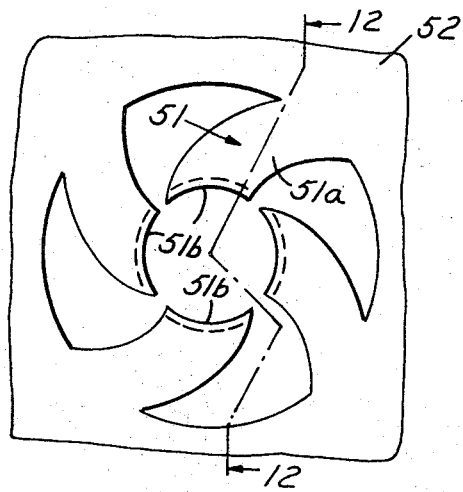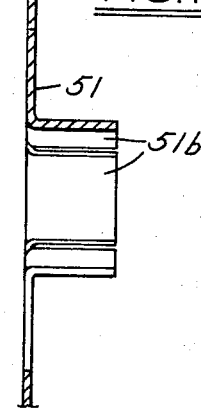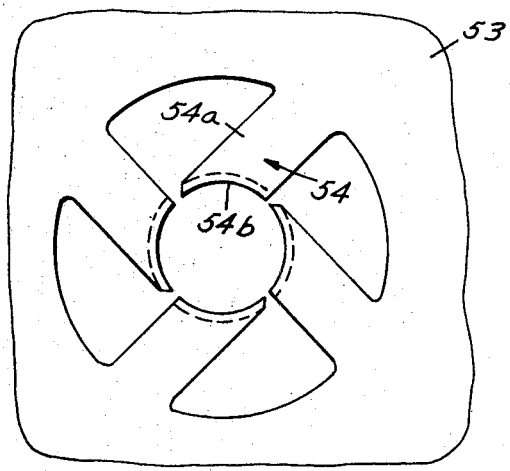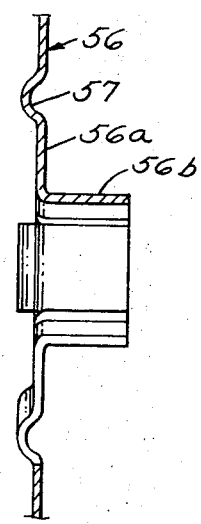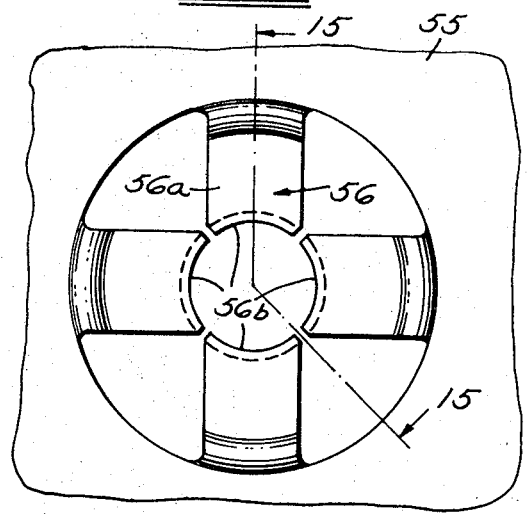

United States Patent Office 3,529,874
Patented Sept. 22, 1970

3,529,874
BEARING STRUCTURE
George W. Hoddy, Owosso, Mich., assignor, by mesne assignments, to Universal Electric Company, Owosso, Mich., a corporation of Delaware
Filed Sept. 27, 1968, Ser. No. 763,129
Int. Cl. F16c 23/00
U.S. Cl. 308—72    13 Claims

ABSTRACT OF THE DISCLOSURE

An electric motor includes a motor housing, a stator and a rotor. The housing has an end wall with an opening therein and slots extending radially outwardly from the opening to define a plurality of cantilever mounted segments. Each segment has a first portion extending generally radially and a second portion forming a free end extending generally axially so that the segment is yieldable axially. In one form, the ends of the segments define a cylindrical supporting surface that engages a spherical contacting surface of a bearing member which has a bore therein for receiving the shaft of the rotor. In another form, the ends of the segments define a spherical supporting surface that engages a cylindrical contacting surface on a bearing member.

This invention relates to bearing structures and particularly to bearing structures for electric motors.

BACKGROUND OF THE INVENTION

An important problem with respect to construction of electric motors is that of providing self-aligning bearing structures which will accommodate for variations due to manufacturing tolerances. Two types of bearing structures are currently in use for such purposes. One common type utilizes a spherical bearing that is held in place by a spring which can be either of the coil or flat type. These types of springs tend to exert uneven forces around the circumferential contacting surfaces with the bearing. Such construction has several important disadvantages. First, such a construction requires a precise matching seat. Second, such a construction tends to pull out of the matching seat when a radial load is applied. If the spring force is made large enough to withstand a large radial load, misalignment of the bearing to the shaft will result increasing the bearing friction and causing a resulting higher power consumption and starting difficulties. Also, because coil springs do not exert equal circumferential pressure, a misalignment is created between the shaft and bearing. Also, when a bearing is supported at one end by a spherical bearing and matching seat, a radial load on the shaft causes binding between the spherical bearing and the shaft.

More successful types of self-aligning bearings are shown in the patents to Hoddy et al. 3,063,761, 3,223,464, 3,273,947 and 3,273,948 and comprise a supporting surface on the motor housing and a contacting surface on a bearing member that supports the shaft. One of these surfaces is resiliently mounted. In addition, one of these surfaces is cylindrical and the other is spherical.

Among the objects of the present invention are to provide a bearing structure of the types shown in the Hoddy et al. patents which is improved, has longer life, utilizes a minimum number of parts, is lower in cost, does not need critical dimensional tolerances, will withstand larger radial loads, and, in addition, has a low noise level.

Further objects of the invention are to provide such a construction which utilizes a ball bearing wherein misalignment of the bearing races is prevented and wherein the bearing outer race cannot turn in the bearing seat.

DESCRIPTION OF THE DRAWINGS

FIG. 1 is a part sectional longitudinal view of an electric motor embodying the invention.
FIG. 2 is a part sectional end view of the same.
FIG. 3 is a fragmentary sectional longitudinal view on a portion of the motor.
FIG. 4 is a fragmentary end view on an enlarged scale.
FIG. 5 is a partly diagrammatic view showing the manner in which the bearing structure is operable to produce the desired result.
FIG. 6 is a fragmentary sectional view through a modified form of bearing.
FIG. 7 is a fragmentary sectional view through a further modified form of bearing.
FIG. 8 is a fragmentary end view of a further modified form of bearing.
FIG. 9 is a fragmentary sectional view taken along the line 9—9 in FIG. 8.
FIG. 10 is a fragmentary sectional view of a modified form of motor embodying the invention.
FIG. 11 is a fragmentary end view of a modified form of motor housing embodying the invention.
FIG. 12 is a fragmentary sectional view taken along the line 12—12 in FIG. 11.
FIG. 13 is a fragmentary end view of a further modified form of motor housing embodying the invention.
FIG. 14 is a fragmentary end view of a further modified form of motor housing embodying the invention.
FIG. 15 is a fragmentary sectional view taken along the line 15—15 in FIG. 14.

DESCRIPTION

Referring to FIGS. 1 and 2, the invention relates to an electric motor which comprises a motor housing 10 of sheet metal or the like which may be made of two sections 11, 12 joined together, a stator 13 fixed in housing 10 and rotor 14 mounted on a shaft 15. A bearing assembly 16 is provided at each end of the housing for rotatably supporting shaft 15.

As shown in FIGS. 1 and 2, each bearing assembly 16 comprises a wall 20 forming an integral end of each section 11, 12 of the housing 10. The wall 20 has an opening therein and circumferentially spaced slots 23 extending radially to define cantilever segments 24. The free ends of the segments 24 are bent and extend axially as shown in FIG. 1 such that each segment includes a first generally radial portion 24a joined to the wall 20 and a second generally axial portion 24b extending axially and comprising the free end of each segment. The wall 20 is made of metal such that each segment 24 which is cantilever mounted has limited axial movement, as presently described.

The bearing structure further includes a bearing member 25 that comprises a sleeve 26 having an axial bore 27 for receiving the shaft 15 and an annular projection 28 that is curved transversely of the bearing member in a direction longitudinally of the bore 27 and preferably centered longitudinally of the bearing member. The center of the spherical contacting surface on the periphery of the projection 28 is aligned substantially on the axis of the bore 27 and, in turn, the cylindrical supporting surface defined by the inner surface of the portion 24b of the segments 24. The cylindrical supporting surface defined by the portions 24b of the segments 24 has a longitudinal extent sufficient to permit relatively unrestrained axial movement of the bearing member relative to the supporting surface. In use, no external force is required to retain the bearing in position or in its seat because the support defined by the segments has its center at the center of the spherical surface on the bearing member. The force imposed by loads on the shaft 15 is thus directly statically balanced by the reaction of the support and it is impossible for the imposed radial load to pull the bearing from its seat.

By providing the annular projection 28 substantially centrally longitudinally of the bearing 25, any tendency of binding between the bearing 25 and the shaft 15 is substantially eliminated.

The manner in which the bearing functions can be more readily understood by reference to the diagram shown in FIG. 5. When the bearing member 25 is inserted in position, the segments 24 are displaced by an angle $\theta$ shown in exaggerated relation in FIG. 5. This is because the outer diameter of the projection 28 is slightly greater than the untensioned diameter of the cylindrical supporting surface defined by the portions 24b of the segments 24. This difference may be on the order of approximately three to six thousandths of an inch but is not necessarily limited to this amount. In accordance with known formulas for analysis of the load applied to the end of a cantilevered section, each segment will be displaced a maximum amount Y according to the following relationship:

$$Y = Pl^3/3EI$$

where

P is the applied load
$l$ is the length of section
E is the modulus of elasticity
I is the section moment of inertia.

The reaction force on each segment of the bearing during this press fit is further shown in FIG. 5 and comprises a force P extending along the axis of the portion 24b. This force can be resolved into two components R and A transversely and axially. The transverse or radial component of the force always tends to retain the bearing within the support.

It has been found that the bearing embodying the invention is extremely rugged. Moreover, it can be used with reciprocating pump and similar loads because there are no springs or similar elastic members to fail under stress. Critical dimensional tolerances are not needed since the cantilever segments will accommodate for any minor deviations in tolerances. It has been further found that the bearing structure will withstand large radial and thrust loads and has a low noise level and long life.

In the form of the invention shown in FIG. 6, the end wall 30 is slotted as in the previous form of the invention to define segments 31 which have a first portion 31a connected to the wall 30 and a second portion 31b extending generally axially. In this form, the portions 31b are curved to define a spherical contacting surface 32 which engages a cylindrical contacting surface 33 on the bearing member 34 that has an opening 35 for receiving the shaft.

In the form of the invention shown in FIG. 7, the motor housing includes segments bent outwardly from the wall 30' to define portions 31a' and 31b'. In this form of the invention, the bearing member 36 comprises a ball bearing including an inner race 37, an outer race 38 and balls or roller members 39. The outer surface of the outer race 38 forms the cylindrical contacting surface that is engaged by the spherical contacting surface defined by the inner surfaces of the portions 31b' of the segments 31'.

In the form of the invention shown in FIGS. 8 and 9, the bearing member comprises a ball bearing applied to a segment structure similar to that shown in FIGS. 1 and 2. Specifically, the end wall 40 of the housing is formed with radially extending slots 41 of uniform width that define segments 42, each of which has a radial portion 42a and axial portion 42b. The inner surfaces of the portions 42b define the cylindrical contacting surface. The bearing member 43 comprises an inner race 44 through which the shaft 15 extends, an outer race 45 and balls 46 interposed between the inner and outer races. The outer surface of the outer race 45, or the outer surface of a ring fixed to the outer race, defines a spherical contacting surface that engages the cylindrical contacting surface defined by the portions 42b of the segments 42.

In the forms of the invention shown in FIGS. 7–9, it has been found that a seat with precision dimensional tolerances for the outer race of the ball bearing is not needed since the resilient segments provide the desired close conformity to maintain the ball bearings centered in position. At the same time, the segments permit self-alignment under load.

In the form of the invention shown in FIG. 10, the wall 20' is formed with a separate portion 50 held in position by the rivets 22. In this form, the segments 24' are formed in the separate portion 50.

In the form of the invention shown in FIGS. 11 and 12, the segments 51 on the end wall 52 have radial portions 51a that are curved counterclockwise inwardly from the wall and axial portions 51b.

In the form of the invention shown in FIG. 13, the end wall 53 is provided with segments 54, each of which has a radial portion 54a that extends generally circumferentially in a clockwise or counterclockwise direction inwardly from wall 53 and an axial portion 54b.

In each of the forms of the invention shown in FIGS. 11–13, greater resiliency or yielding movement of the portions 51b, 54b is achieved by having the portions 51a, 54a longer in a radial direction by the construction shown.

In the form of the invention shown in FIGS. 14 and 15, the wall 55 is provided with segments 56, each of which has a generally radial portion 56a and an axial portion 56b. The radial portion 56a is formed with a transverse rib 57 intermediate its ends that provides greater resiliency at that point so that the portion 56b will more readily yield radially.

I claim:

1. The combination comprising
   a motor housing or the like having spaced end walls,
   said motor housing having a portion of each end wall thereof formed with an opening therein,
   each said wall having a plurality of radially extending slots defining segments,
   said segments having their free ends bent with relation to the portions thereof which are joined to the end wall so that a first portion of each segment adjacent the end wall extends generally radially and a second portion at the free end extends generally axially inwardly of the motor housing,
   said second portions defining an annular supporting surface,
   each said segment being radially yieldable,
   a bearing member for each end of said housing,
   each said bearing member having a bore for receiving a shaft,
   each said bearing member having an outer perimeter defining a contacting surface portion,
   one of said annular supporting surface and said contacting surface of said bearing member having a spherical configuration transversely in a direction along the axis of said bore and the other of said annular contacting surface and contacting surface being cylindrical,
   said surface having its center aligned substantially on the axis of the cylindrical surface and having a diameter substantially equal to the diameter of the cylindrical surface,
   said cylindrical surface having a longitudinal extent sufficient to permit relative unrestrained axial movement of said bearing member relative to said spherical surface.

2. A self-aligning bearing structure for a shaft comprising
   a bearing member having a bore for receiving a shaft,
   a wall comprising a plurality of circumferentially spaced cantilever supported segments circumscribing an annular supporting surface, each said segment comprising a base fixed to the end of said housing, a first portion extending generally radially from said base and a second portion extending generally axially and defining a free end, each said segment being axially yieldable, said bearing member having an outer perimeter defining a contacting surface, one of said annular supporting surface and said contacting surface of said bearing member having a curved configuration transversely in a direction along the axis of said bore and the other of said annular supporting surface and contacting surface being substantially cylindrical longitudinally of the bore, the diameter of said annular supporting surface being substantially equal to the diameter of said surface, the cylindrical surface having a longitudinal extent sufficient to permit relative unrestrained axial movement of said bearing member relative to said curved surface.

3. The combination set forth in claim 2 wherein said cylindrical surface comprises the annular surface circumscribed by said segments and said curved surface comprises the outer preiphery of said bearing member.

4. The combination set forth in claim 2 wherein said outer contacting surface of said bearing member comprises said cylindrical surface and said supporting surface comprises said curved surface.

5. The combination set forth in claim 2 wherein said bearing member comprises a bearing having an inner race, an outer race engaging said supporting surface and roller members interposed between said inner race and said outer race.

6. The combination set forth in claim 5 wherein the outer periphery of said outer race defining said curved surface and said supporting surface defines said cylindrical surface.

7. The combination set forth in claim 5 wherein said outer contacting surface of said bearing member comprises said cylindrical surface and said supporting surface comprises said curved surface.

8. The combination set forth in claim 2 wherein said well and said segments are made of sheet metal.

9. The combination set forth in claim 2 wherein said segments form a part of a separate wall which is fixed to said first-mentioned wall.

10. The combination set forth in claim 2 wherein the first portions of said segments extend generally circumferentially of said bearing member.

11. The combination set forth in claim 10 wherein said first portions are curved circumferentially.

12. The combination set forth in claim 10 wherein said first portions are straight circumferentially.

13. The combination set forth in claim 2 wherein each first portion of said segments is provided with an intermediate portion which has a formed cross section providing increased yielding movement radially.

References Cited

UNITED STATES PATENTS

| | | | |
|---|---|---|---|
| 1,444,751 | 2/1923 | Mueller | 310—90 |
| 1,978,484 | 10/1934 | Aufiero | 308—72 |
| 2,316,693 | 4/1943 | Hoddy | 308—72 |
| 2,739,020 | 3/1956 | Howes | 308—132 |
| 3,063,761 | 11/1962 | Hoddy | 308—72 |
| 3,070,409 | 12/1962 | Jakel | 310—90 |
| 3,239,287 | 3/1966 | Rose | 308—72 |

MILTON O. HIRSHFIELD, Primary Examiner

R. SKUDY, Assistant Examiner

U.S. Cl. X.R.

308—132; 310—89, 90